US008331791B2

(12) United States Patent
Hong

(10) Patent No.: US 8,331,791 B2
(45) Date of Patent: Dec. 11, 2012

(54) COLORLESS OPTICAL TRANSCEIVER AND OPTICAL COMMUNICATION SYSTEM

(75) Inventor: Seung Joo Hong, Anyang-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 364 days.

(21) Appl. No.: 12/504,199

(22) Filed: Jul. 16, 2009

(65) Prior Publication Data

US 2010/0014864 A1 Jan. 21, 2010

(30) Foreign Application Priority Data

Jul. 17, 2008 (KR) ........................ 10-2008-0069417

(51) Int. Cl.
*H04B 10/00* (2006.01)

(52) U.S. Cl. .......................... 398/137; 398/135; 398/138

(58) Field of Classification Search .......... 398/182–201, 398/135–139
See application file for complete search history.

(56) References Cited

U.S. PATENT DOCUMENTS

| 7,106,974 B2 * | 9/2006 | Lee et al. ........................ 398/168 |
| 7,593,647 B2 * | 9/2009 | Lee et al. ........................ 398/195 |
| 7,639,954 B2 * | 12/2009 | Lam et al. ...................... 398/198 |
| 2003/0007207 A1 | 1/2003 | Healey et al. |
| 2006/0045542 A1 | 3/2006 | Lee et al. ........................ 398/195 |
| 2006/0140548 A1 | 6/2006 | Shin et al. ........................ 385/89 |

FOREIGN PATENT DOCUMENTS

| KR | 10-0325687 | 2/2002 |
| WO | WO 2009/051313 A1 | 4/2009 |

OTHER PUBLICATIONS

European Search Report dated Oct. 21, 2009.

* cited by examiner

*Primary Examiner* — Agustin Bello
(74) *Attorney, Agent, or Firm* — KED & Associates, LLP

(57) ABSTRACT

A colorless optical transceiver and an optical communication system including the same are disclosed herein. A controlling unit of the colorless optical transceiver forms a control current based on intensity of an external-injection light provided from an external light source. A light source driving unit coupled to the controlling unit forms a driving current based on the control current. An internal light source is coupled to the light source driving unit, the internal light source being configured to receive the external-injection light and the driving current and to convert the driving current into a colorless sending light, wherein a wavelength of the colorless sending light is locked by that of the external-injection light. The light output from the internal light source is controlled based on intensity of external-injection light calculated by using optical loss, which varies according to the distances between optical devices and connection state. Thus, the light output from the colorless optical transceiver and the extinction ratio may be stabilized.

10 Claims, 4 Drawing Sheets

COLORLESS OPTICAL TRANSCEIVER AND OPTICAL COMMUNICATION SYSTEM

This application claims priority from Korean Patent Application No. 10-2008-69417 filed on Jul. 17, 2008, the entire subject matter of which is incorporated herein by reference.

BACKGROUND OF THE INVENTION

1. Field

Embodiments of the present invention may generally relate to optical communication systems. More particularly, embodiments of the present invention may relate to a colorless optical transceiver and an optical communication system including the same.

2. Background

In an optical wavelength division multiplexing (WDM) communication system, different wavelengths of light are transmitted and received through an optical fiber. Thus, a large amount of data can be transmitted at a time and a bandwidth can be increased. Further, the rental or management cost of an optical line can be reduced by using one optical fiber instead of a number of optical fibers.

In the conventional WDM, different wavelengths are outputted from optical transceivers for their respective channels. Further, the different wavelengths are inputted to a wavelength division multiplexer, which is configured with thin film optical filters or arrayed waveguide gratings. Thus, different optical transceivers are needed for the respective channels. Also, one or more spare optical transceivers should be prepared per channel for maintenance and repair purposes.

Korean Patent No. 10-0325687 entitled "A low-cost WDM source with incoherent light injected Fabry-Perot semiconductor laser diode" and U.S. Patent Publication No. 2003/0007207 entitled "Optical signal transmitter" disclose a colorless (or color free) wavelength division scheme. According to this scheme, the wavelength output from the optical transceiver is determined with a wavelength allocated to a port between the optical transceiver and the wavelength division multiplexer. Light output from an incoherence broadband light source (BLS) is guided to the thin film optical filters or the arrayed waveguide gratings and injected into a Fabry-Perot Laser Diode (FP-LD), a Semiconductor Optical Amplifier (SOA) or a Reflective Semiconductor Optical Amplifier (RSOA) (collectively referred to as FP-LD). The wavelength of output light from FP-LD is locked to that of an incoherent or coherent external injection light, thereby obtaining a specific wavelength.

In the conventional optical transceivers, the intensity of the external-injection light is not uniform. Further, the external-injection light and the light output from FD-LD itself may not be discriminated against each other. These problems cause errors in controlling FP-LD. Thus, it is difficult to obtain a stabilized output from the optical transceiver and to maintain uniform extinction ratio relating to the quality of optical signals.

BRIEF DESCRIPTION OF THE DRAWINGS

Arrangements and embodiments are described in detail with reference to the following drawings in which like reference numerals refer to like elements and wherein.

DETAILED DESCRIPTION

Embodiments of the present invention provide a colorless (color free) optical transceiver, which may control an output light based on the intensity of external-injection light for locking a wavelength of light and an optical communication system including the same. The optical communication system may be a wavelength division multiplexing (WDM) system.

Figure 1:
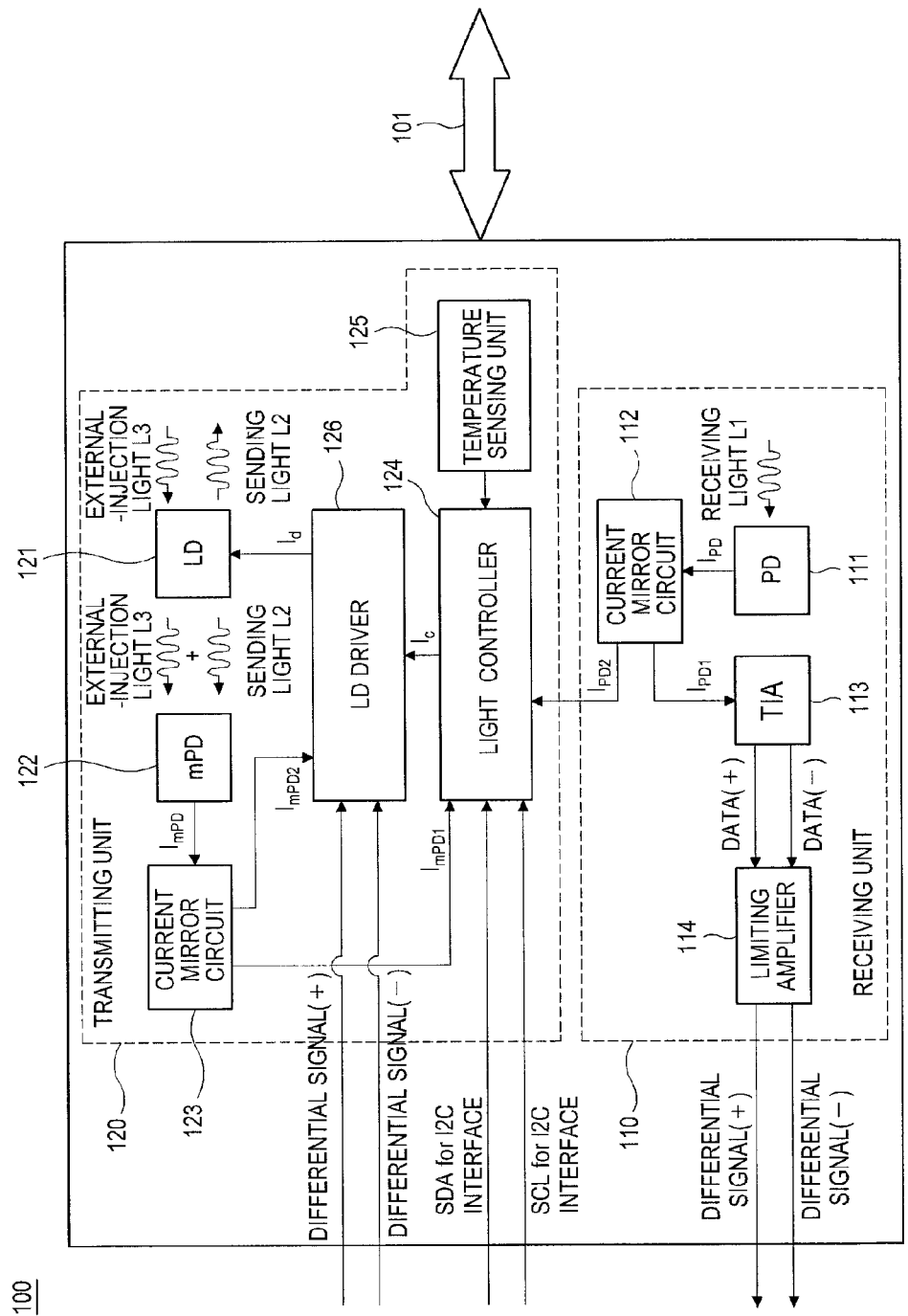
FIG. 1 shows a schematic diagram of a colorless optical transceiver in accordance with the present invention.

Referring to FIG. 1, a colorless optical transceiver 100 may include a receiving unit 110 and a transmitting unit 120. An optical/electrical conversion unit such as a photo diode (PD) 111 in the receiving unit 110 may receive the receiving light L1 from a communication counterpart (not shown) and may convert the receiving light L1 into the receiving current $I_{PD}$. A current mirror circuit 112 may receive the receiving current $I_{PD}$ and output two mirror currents $I_{PD1}$ and $I_{PD2}$, which may be identical to receiving the current $I_{PD}$. A transimpedance amplifier (TIA) 113 may convert one mirror current $I_{PD1}$ into a voltage signal and may amplify the voltage signal. A limiting amplifier 114 may compare the input voltage signal from transimpedance amplifier (TIA) 113 with a threshold voltage level and output a differential data signal. The differential data signal, which is denoted with "+(1)" or "−(0)", may indicate that the voltage signal is larger or smaller than the threshold voltage level. That is, the differential data signal may denote the conversion data from optical to electrical of receiving light L1 (whether the intensity of receiving light L1 is larger than the threshold intensity), which may be a sending light of the communication counterpart. The differential data signal output from the limiting amplifier 114 may be inputted into a physical layer processing unit (not shown), which extracts data from electric signals such as the differential data signal.

An internal light source configured with a laser diode (LD) 121 in the transmitting unit 120 may convert the driving current Id into an optical signal, i.e., sending light L2. The wavelength of the sending light L2 may be identical to that of the external-injection light L3. That is, the LD 121 may output the colorless sending light L2, the wavelength of which is locked by that of the external-injection light L3. The light source LD 121 may be configured with a wavelength-locked Fabry-Perot Laser Diode (FP-LD), Semiconductor Optical Amplifier (SOA) or Reflective Semiconductor Optical Amplifier (RSOA). A part of the sending light L2 outputted from LD 121 may be transmitted to a destination through the optical fiber 101. The rest of the sending light L2 may be inputted into the monitor photo diode (mPD) 122. The external-injection light L3 may pass through the light source LD 121 and may be inputted into the monitor photo diode (mPD) 122.

As another optical/electrical conversion unit, the monitor photo diode (mPD) 122 may convert the mixed light of sending light L2 and external-injection light L3 into the monitor current $I_{mPD}$. The current mirror circuit 123 may receive the monitor current $I_{mPD}$ and output two monitor mirror currents $I_{mPD1}$ and $I_{mPD2}$, which may be identical to the monitor current $I_{mPD}$.

The light controller 124 may receive information on the initial intensity of the receiving light L1 from the communication counterpart and the initial intensity of the external-injection light L3 from an external device (not shown)

through I2C interfaces. The light controller 124 may receive the mirror current $I_{PD2}$ and calculate the intensity of receiving light L1 based on the magnitude of mirror current $I_{PD2}$. The light controller 124 may also calculate optical loss by an optical fiber (or optical fibers) with the difference between the initial intensity of receiving light L1 and the calculated intensity of receiving light L1. Further, the light controller 124 may calculate the intensity of external-injection light L3 by using the information on the initial intensity of external-injection light L3 and the calculated optical loss. The light controller 124 may receive the monitor mirror current $I_{mPD1}$ and calculate the intensity of mixed light of sending light L2 and external-injection light L3 based on the monitor mirror current $I_{mPD1}$. The light controller 124 may also calculate the intrinsic intensity of sending light L2 with the difference between intensities of the mixed light and external-injection light L3. Further, the light controller 124 may determine control current Ic based on the intrinsic intensity of sending light L2. That is, the light controller 124 may determine the control current Ic in consideration of the intensity of external-injection light L3. Abbreviations "SCL" and "SDL" in FIG. 1 denote "serial clock line" and "serial data line", respectively.

The wavelength-locked colorless optical transceiver 100 may further include a temperature sensing unit 125 providing temperature around the optical transceiver 100. In case of adopting the temperature sensing unit 125, the light controller 124 may determine the control current Ic based on the intrinsic intensity of sending light L2 and the temperature.

A light source driving unit such as a laser diode driver (LD Driver) 126 may receive the monitor mirror current $I_{mPD2}$, the control current Ic and the differential data signal. The differential data signal may be received from a physical layer processing unit. The LD Driver 126 may control a driving resistance based on the monitor mirror current $I_{mPD}$, the control current Ic and the differential data signal to determine the driving current Id. The LD Driver 126 may perform the automatic power control (APC) by receiving the monitor mirror current $I_{mPD2}$ caused from the mixed light and may form the driving current Id with the control current IC determined with the intrinsic intensity of the light output from LD 121. Thus, the light output from the colorless optical transceiver 100 and the extinction ratio may be stabilized. Further, the quality of the optical signal can be improved.

In accordance with an embodiment of the present invention, the colorless optical transceiver may be a bidirectional or unidirectional device. The bidirectional colorless optical transceiver may transmit and receive light through an optical fiber 101 as shown in FIG. 1. In the unidirectional colorless optical transceiver, lights may be transmitted and received through different optical fibers.

Figure 2:
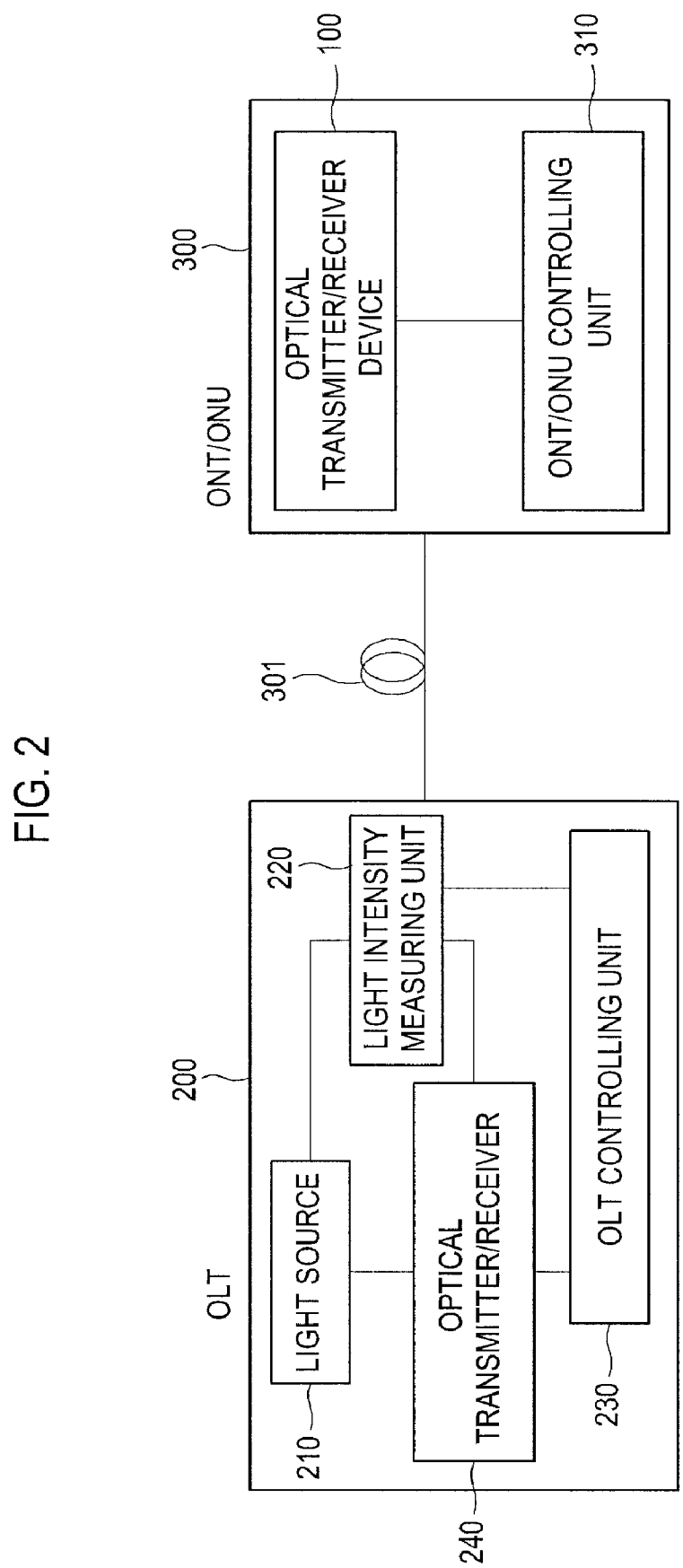
FIG. 2 shows an optical line terminal and an optical network terminal/optical network unit in an optical communication system, which include at least one colorless optical transceiver shown in FIG. 1.

Referring to FIG. 2, the wavelength-locked optical transceiver may be utilized in a wavelength division multiplexing (WDM) optical communication system in accordance with embodiments of the present invention. The WDM optical communication system may be adopted in a passive optical network (PON). However, the application of the WDM optical communication system is not limited to PON. For example, the WDM optical communication system may be also adopted in a backbone network.

The WDM optical communication system may comprise an optical line terminal (OLT) 200 and an optical network terminal (ONT) or an optical network unit (ONU) (hereinafter abbreviated as ONT/ONU) 300. ONT/ONU 300 may be located at a subscriber's home or a dense region. While FIG. 2 shows that one ONT/ONU is coupled to OLT 200 for simplicity, a plurality of ONT/ONU 300 may be coupled to OLT 200 through multiple channels, i.e each different wavelengths. In such a case, the same number of optical transmitter/receivers 240 may be needed as the channels, i.e each different wavelengths in OLT 200. ONT/ONU 300 may convert optical signals into electric signals and vice versa. A wavelength division multiplexing device (not shown) such as thin film optical filters or arrayed waveguide gratings may be located at the remote node (RN) between OLT 200 and ONT/ONU 300. OLT 200 may transmit wavelength-multiplexed optical signals. The wavelength-multiplexed optical signals may be divided at RN and transmitted to ONT/ONU 300. Light output from the wavelength-locked colorless optical transceiver 100 may be multiplexed at RN and transmitted to OLT 200. The wavelength-locked colorless optical transceiver 100 in ONT/ONU 300 may be configured as shown in FIG. 1.

Figure 3:
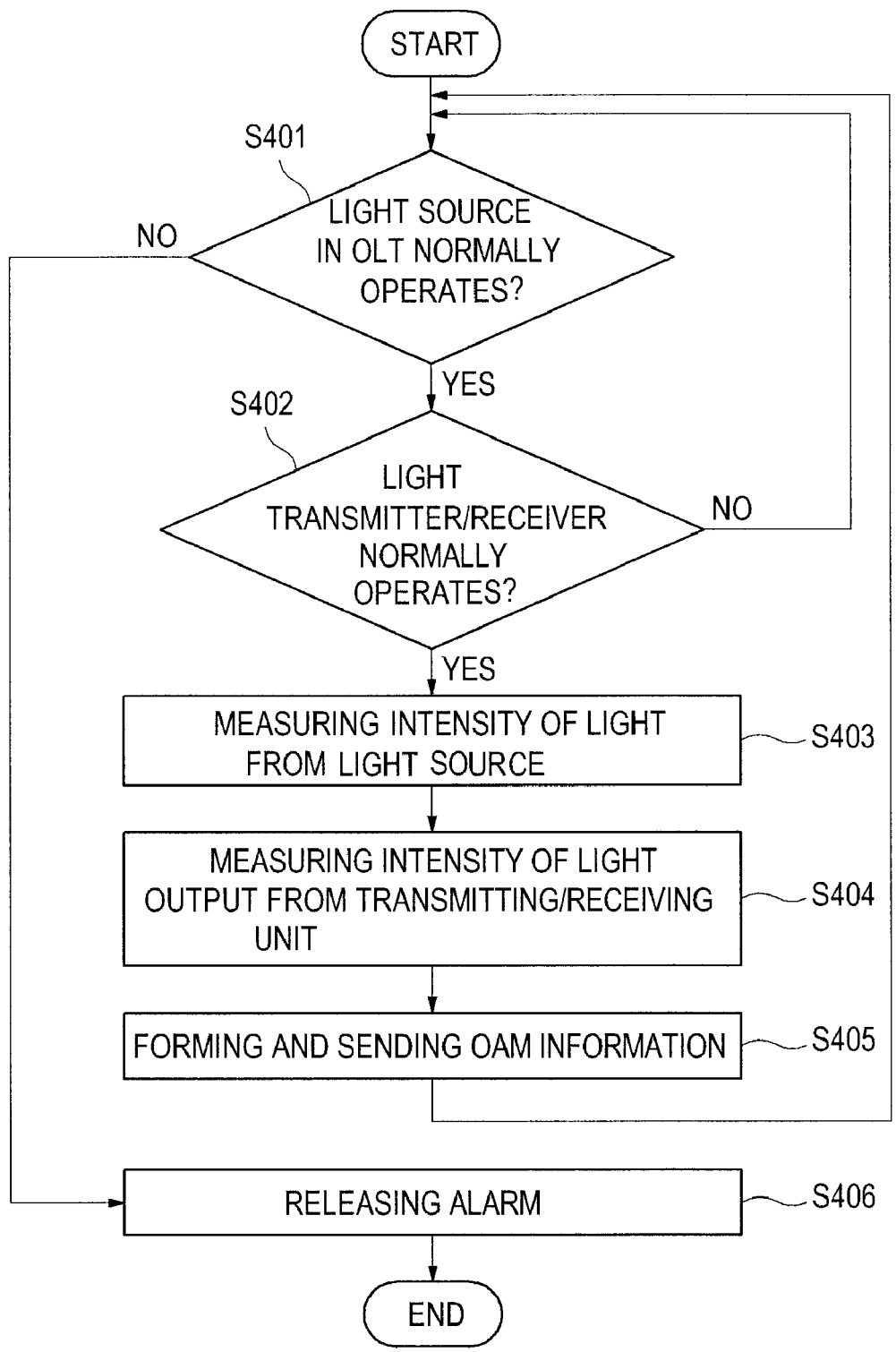
FIG. 3 is a flow chart showing a method of controlling the optical line terminal.

Referring to FIGS. 2 and 3, the light source 210 in OLT 300 may output incoherent or coherent light, which has passed through thin film optical filters or arrayed waveguide gratings. The light source 210 may output the external-injection light transmitted to ONT/ONU 300. Thus, the light source 210 may be an external light source of the optical transceiver 100 in ONT/ONU 300. The light intensity measuring unit 220 may measure the intensity of the light output from the light source 210 and a receiving light transmitted form the optical transceiver 100 of ONT/ONU 300. The optical transmitter/receiver 240 may transmit a wavelength locked optical signal at the external-injection light output from the light source 210 to the optical transceiver 100 in ONT/ONU 300. The optical transmitter/receiver 240 may also transmit information on the intensity of the external-injection light, and the multiplexed optical signals to the optical network unit and to receive the colorless light. The multiplexed optical signals may be the receiving signal of the optical transceiver 100 through the RN.

The OLT controlling unit 230 may determine whether the light source operates normally by comparing the measured intensity of the light with a preset intensity of the light output from the light source 210 (at S401). When the light output is abnormal, the OLT controlling unit 230 may release alarm to inform that an error is generated in the light source 210 and to stop the processes (at S406). When the light output is normal, the OLT controlling unit 230 may determine whether the optical transmitter/receiver 240 in OLT 200 operates normally and may determine whether optical signals transmitted from ONT/ONU 300 are detected normally at the optical transmitter/receiver 240 (S402). If the optical signals are not detected normally, then the process may be restarted from step S401. If the optical signals are detected at the optical transmitter/receiver 240, then the light intensity measuring unit 220 may measure the intensity of light output from the light source 210 for the respective channels (S403) and may measure the intensity of light output from the optical transmitter/receiver 240 for the respective channels (S404). The OLT controlling unit 230 may form information on operation, administration and management (OAM), which may include information on the intensities of light output from the light source 210 and the light output from the optical transceiver for the respective channels. The OAM information may be transmitted to ONT/ONU 300 along with data through the optical fiber 301 (S405).

The information on intensity of light output from the light source 210 may include the information on the intensity of external-injection light for every channel. The information on intensity of light output from the optical transmitter/receiver 240 for every channel may include the initial intensity of the receiving light of the optical transmitter/receiver 240. Steps from S401 to S405 may be repeatedly performed to check whether the light source 210 in OLT 200 operates normally, to check whether optical signals are normally transmitted between OLT 200 and ONT/ONU 300 and to repeatedly provide the OAM information including the information on the intensity of light output from the light source 210 and the intensity of light output from the optical transceiver 200. The OAM information may be converted into optical signals and transmitted from OLT 200 to ONT/ONU 300 through the optical fiber 301.

Figure 4:
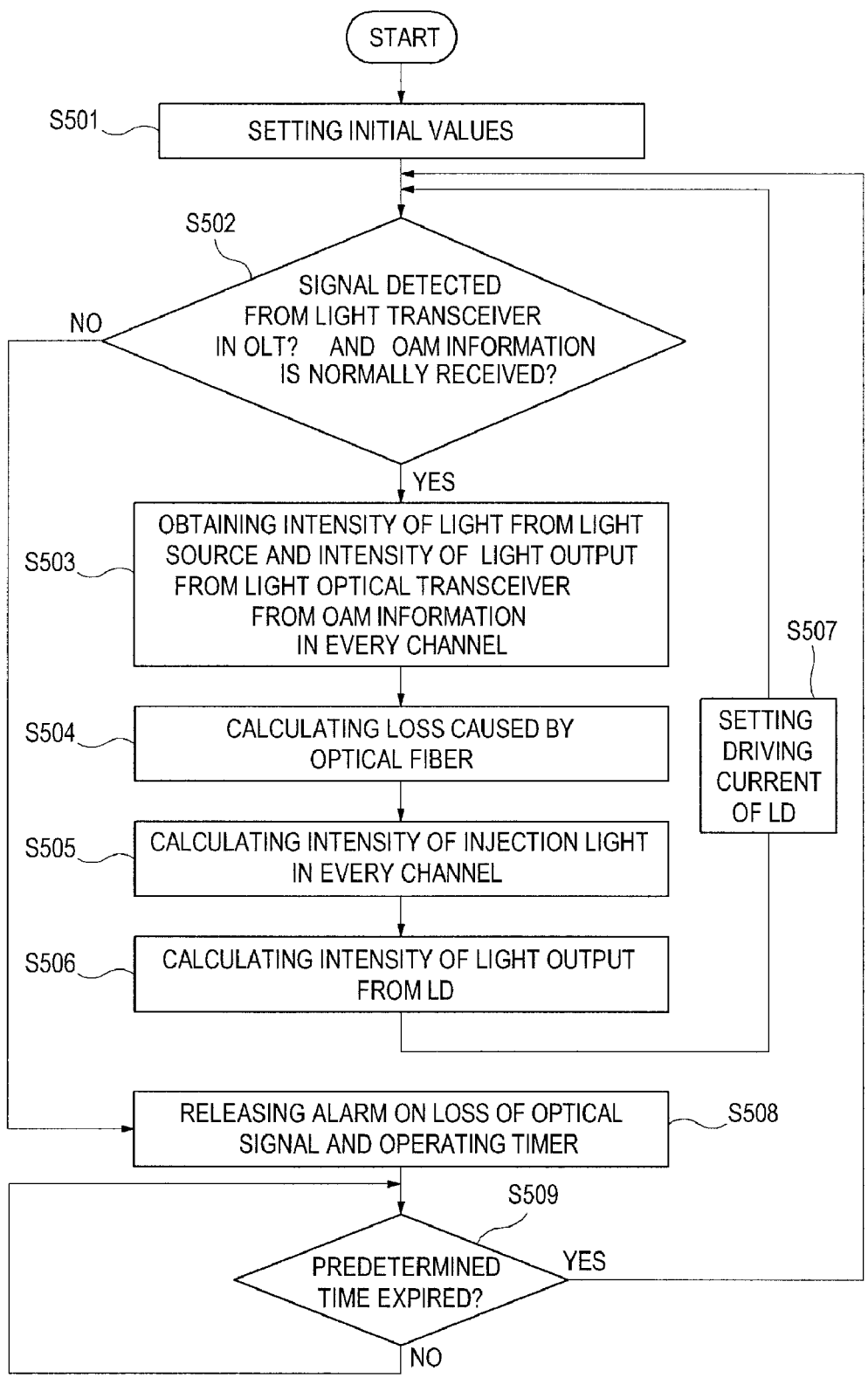
FIG. 4 is a flow chart showing a method of controlling the optical network terminal/optical network unit.

Referring to FIGS. 2 to 4, the optical transceiver 100 in ONT/ONU 300 may receive the incoherent or coherent light output generated by the light source 210 in OLT 200 as external-injection light for locking the wavelength. Further, the optical transceiver 100 may receive the light transmitted from OLT 200 as the receiving light. The optical transceiver 100 in ONT/ONU 300 may set an initial-driving-value, i.e., driving current Id, in order to drive the laser diode LD 121 (S501). The optical transceiver 100 may also determine whether optical signals transmitted from the optical transmitter/receiver 240 is received and detected normally and whether the OAM information formed in the OLT controlling unit 230 is received normally (S502).

If the optical signals transmitted from OLT 200 is detected normally and the OAM information is received normally, then the optical transceiver 100 may extract the intensities of light output from the optical transmitter/receiver 240 for every channel from the OAM information transmitted from OLT 200 through I2C interface (S503). The optical transceiver 100 may calculate the optical loss caused in the optical fiber by using the difference between the intensity of light output from the optical transmitter/receiver 240 in OLT 200 and the intensity of the receiving light (loss caused by the optical fiber=intensity of light output from the optical transmitter/receiver in OLT−intensity of the receiving light) (S504).

The optical transmitter/receiver 240 of every channel in OLT 200 may transmit light (optical signals), which is received at the optical transceiver as the receiving light L1 shown in FIG. 1. The optical transceiver 100 may calculate the intensity of light (external-injection light) inputted into the optical transceiver 100 by using the difference between the intensity of light output from the light source and the optical loss caused by the optical fiber (S505). The optical transceiver 100 may also calculate the intrinsic intensity of the light output from an internal light source such as LD 121 shown in FIG. 1 by subtracting the intensity of external-injection light from the intensity of mixed light of the light output from the internal source and the external-injection light (S506). The optical transceiver 100 may determine the control current Ic to be inputted into the LD driver 124 based on the intrinsic intensity of the light output from LD 121. In case of adopting the temperature sensing unit 125, the optical transceiver 100 may determine the control current Ic based on the intrinsic intensity of light output from LD 121 and the temperature around the optical transceiver 100.

The optical transceiver 100 may determine the driving current Id based on differential data signals input from external and control current Ic (S507). After step S507, the ONT/ONU controlling unit 310 may repeat the processes from step S502.

At step 502, if it is determined that the optical signal transmitted from the optical transmitter/receiver 240 in OLT 200 is not received or detected normally or the OAM information is not received normally, then the ONT/ONU controlling unit 310 may release an alarm on the loss of the optical signal and operate a timer (S508). The ONT/ONU controlling unit 310 may determine whether a predetermined time has expired (S509). If the time has expired, then the ONT/ONU controlling unit 310 may repeat the processes from step S502.

In the embodiments of the present invention, the light output from the laser diode may be controlled based on the intensity of external-injection light and the loss of optical fiber, which varies according to the distances between the optical devices and the connection state. Thus, the light output from the colorless optical transceiver and the extinction ratio may be stabilized.

According to an embodiment of the present invention, a colorless optical transceiver comprises: a controlling unit configured to form a control current based on intensity of an external-injection light provided from an external light source; a light source driving unit coupled to the controlling unit, the light source driving unit being configured to form a driving current based on the control current; and an internal light source coupled to the light source driving unit, the internal light source being configured to receive the external-injection light and the driving current and to convert the driving current into a colorless sending light, wherein a wavelength of the colorless sending light is locked by that of the external-injection light.

According to another embodiment of the present invention, an optical communication system comprises: an optical line terminal configured to transmit an external-injection light and wavelength-multiplexed optical signals; at least one optical network terminal coupled to the optical line terminal, wherein the optical network includes a colorless optical transceiver configured to receive the external-injection light and to output colorless sending light; and a wavelength division multiplexing device coupled to the optical line terminal and the optical network terminal, the wavelength division multiplexing device being configured to divide the wavelength-multiplexed optical signals, to transmit the divided optical signals to the optical network terminal, to multiplex the colorless sending light, and to transmit the multiplexed colorless sending light to the optical line terminal. The colorless optical transceiver may includes a controlling unit configured to form a control current based on intensity of the external-injection light provided from the optical line terminal; a light source driving unit coupled to the controlling unit, the light source driving unit being configured to form a driving current based on the control current; and an internal light source coupled to the light source driving unit, the internal light source being configured to receive the external-injection light and the driving current and to convert the driving current into a colorless sending light, wherein a wavelength of the colorless sending light is locked by that of the external-injection light.

Although embodiments have been described with reference to a number of illustrative embodiments thereof, it should be understood that numerous other modifications and embodiments can be devised by those skilled in the art that will fall within the scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A colorless optical transceiver, comprising:
a controller to faun a control current based on a first signal indicative of an intensity of first light and a second signal indicative of an intensity of second light, wherein the first light is based on an external-injection light provided from an external light source and wherein the second light corresponds to light received by an optical receiver coupled to an optical fiber of an optical communication system;

a light source driver, coupled to the controller, to from a driving current based on the control current and the first signal; and an internal light source coupled to the light source driver, the internal light source being configured to receive the external-injection light and the driving current and to generate third light corresponding to colorless sending light based on the driving current, wherein:

the third light is output from the internal light source to a transmission path, the first light includes the external-injection light mixed with the third light, the first light is output from the internal light source along an optical path to a detector that generates the first signal, the control current is generated by the controller based on the first signal indicative of the intensity of the first light, and a wavelength of the third light corresponding to the colorless sending light is based on a wavelength of the external-injection light, wherein the colorless optical transceiver further comprises:

a first optical/electrical converter to convert light received by the optical receiver into a receiving current, wherein the controller: receives information on an initial intensity of the second light and an initial intensity of the external-injection light; calculates the intensity of the second light based on the receiving current, wherein the second signal is indicative of the calculated intensity; and estimates an optical loss through the optical fiber based on a difference between the information on the initial intensity and the calculated intensity of the second light, wherein an intensity of the external-injection light is determined based on the initial intensity of the external-injection light and the optical loss, a second optical/electrical converter to receive first light corresponding to the mixed light of the external-injection light and the third light and to convert the mixed light into a monitor current, wherein the controller: calculates the intensity of the first light based on the monitor current, calculates an intrinsic intensity of the third current based on a difference between the intensity of the external-injection light and the intensity of the mixed light, and generates the control current based on the intrinsic intensity of the third light, wherein the first optical/electrical converter includes a photo diode, the internal light source includes a laser diode, and the second optical/electrical converter includes a monitor photo diode, and wherein the colorless optical transceiver further comprises:

a first mirror current circuit to receive the receiving current and to output first and second mirror currents that are at least substantially identical to the receiving current;

a transimpedance amplifier to convert the first mirror current into a voltage signal and amplify the voltage signal; and a limiting amplifier to compare the voltage signal with a threshold voltage level and output a differential data signal.

2. The colorless optical transceiver of claim 1, wherein the internal light source is selected from the group consisting of a wavelength-locked Fabry-Perot Laser Diode (FP-LD), Semiconductor Optical Amplifier (SOA) and Reflective Semiconductor Optical Amplifier (RSOA).

3. The colorless optical transceiver of claim 1, further comprising: a second mirror current circuit configured to receive the monitor current and to output third and fourth mirror currents that are at least substantially identical to the receiving current, wherein the light source driver is configured to faun the driving current based on magnitudes of the fourth mirror current and sending light and the control current.

4. The colorless optical transceiver of claim 3, further comprising:

a temperature sensor to determine a temperature around the colorless optical transceiver, and wherein the controller is configured to determine the control current based on an intensity of the external-injection light and the measured temperature.

5. The colorless optical transceiver of claim 1, wherein the wavelength of the third light is locked based on the wavelength of the external-injection light.

6. The colorless optical transceiver of claim 1, wherein the driving current is based on the differential data signal.

7. An optical communication system, comprising:

an optical line terminal configured to transmit an external-injection light and wavelength-multiplexed optical signals;

at least one optical network terminal coupled to the optical line terminal, wherein the optical network includes a colorless optical transceiver configured to receive the external-injection light and to output colorless sending light; and a wavelength division multiplexing device coupled to the optical line terminal and the optical network terminal, the wavelength division multiplexing device being configured to divide the wavelength-multiplexed optical signals, to transmit the divided optical signals to the optical network terminal, to multiplex the colorless sending light, and to transmit the multiplexed colorless sending light to the optical line terminal, wherein the colorless optical transceiver includes:

a controller to form a control current based on intensity of the external-injection light provided from the optical line terminal;

a controller to form a control current based on a first signal indicative of an intensity of first light and a second signal indicative of an intensity of second light, wherein the first light is based on the external-injection light provided from the optical line terminal and wherein the second light corresponds to light received by an optical receiver coupled to an optical fiber of an optical communication system;

a light source driver, coupled to the controller, to form a driving current based on the control current and the first signal; and an internal light source coupled to the light source driver, the internal light source being configured to receive the external-injection light and the driving current and to generate third light corresponding to colorless sending light based on the driving current, wherein:

the third light is output from the internal light source to a transmission path, the first light includes the external-injection light mixed with the third light, the first light is output from the internal light source along an optical path to a detector that generates the first signal, the control current is generated by the controller based on the first signal indicative of the intensity of the first light, and a wavelength of the third light corresponding to the colorless sending light is based on a wavelength of the external-injection light, wherein the optical transceiver further includes a first optical/electrical converter to receive light from an external communication device and to convert the light into a receiving current, wherein the controller: receives information on an initial intensity of the second light from the external communication device and an initial intensity of the external-injection light from the external communication device; calculates the intensity of the second light based on the receiving current, wherein the second signal is indicative of the calculated intensity; estimates an optical loss through the optical fiber based on a difference between the information on the initial intensity and the calculated intensity of the second light, and determining an intensity of the external-injection light based on the initial intensity of the external-injection light and the optical loss, wherein the optical transceiver further includes a second optical/electrical converter to receive first light corresponding to the mixed light of the external-injection light and the third light and to convert the mixed light into a monitor current, wherein the controller: calculates the intensity of the first light based on the monitor current, calculates an intrinsic intensity of the third current based on a difference between the intensity of the external-injection light and the intensity of the mixed light, and generates the control current based on the intrinsic intensity of the third light, and wherein the optical transceiver further includes:
a first mirror current circuit to receive the receiving current and to output first and second mirror currents that are at least substantially identical to the receiving current;
a transimpedance amplifier to convert the first mirror current into a voltage signal and amplify the voltage signal; and
a limiting amplifier to compare the voltage signal with a threshold voltage level and output a differential data signal.

8. The optical communication system of claim 7, wherein the first optical/electrical converter includes a photo diode, the internal light source includes a laser diode, and the second optical/electrical converter includes a monitor photo diode.

9. The colorless optical transceiver of claim 3, wherein the optical transceiver further includes:
a second mirror current circuit configured to receive the monitor current and to output third and fourth mirror currents that are at least substantially identical to the receiving current; and wherein the light source driver is configured to form the driving current based on the magnitudes of the fourth mirror current and sending light and the control current.

10. The colorless optical transceiver of claim 9, wherein the optical transceiver further includes: a temperature sensor to determine a temperature around the colorless optical transceiver; and wherein the controller determines the control current based on intensity of the external-injection light and the measured temperature.

* * * * *